United States Patent [19]
Patel

[11] Patent Number: 5,901,683
[45] Date of Patent: May 11, 1999

[54] INDIRECT MONITORING AND CONTROL OF VISIBLE EXHAUST EMISSIONS FROM A DIESEL ENGINE

[75] Inventor: Sagar Arvindbhai Patel, Erie, Pa.

[73] Assignee: General Electric Company, Erie, Pa.

[21] Appl. No.: 08/901,746

[22] Filed: Jul. 28, 1997

[51] Int. Cl.$^6$ .............................. F02D 41/14; B60L 11/08
[52] U.S. Cl. ........................ 123/352; 123/357; 123/478; 290/17; 290/40 C
[58] Field of Search ..................................... 123/352, 357, 123/446, 478, 486, 681, 684, 687, 689; 290/17, 40 R, 40 A, 40 C; 701/103, 104

[56] References Cited

U.S. PATENT DOCUMENTS

| | | | |
|---|---|---|---|
| 5,150,694 | 9/1992 | Currie et al. | 123/687 |
| 5,415,139 | 5/1995 | Aoto et al. | 123/192.1 |
| 5,425,338 | 6/1995 | Gottemoller | 123/357 X |
| 5,826,563 | 10/1988 | Patel et al. | 123/481 |

*Primary Examiner*—Tony M. Argenbright
*Attorney, Agent, or Firm*—Jill M. Breedlove; Douglas E. Stoner

[57] ABSTRACT

A system and method are provided for limiting visible exhaust emissions from a diesel-electric traction vehicle system including a multi-cylinder diesel engine connected for driving a synchronous generator to produce AC electric power, a rectifier connected for converting the AC electric power to DC electric power on a DC link, at least one inverter coupled to the DC link for providing controlled frequency AC power to at least one electric traction motor coupled in driving relationship to at least one wheel of the vehicle. The air-fuel ratio at the engine is regulated to minimize any difference between actual air-fuel ratio and a predetermined preferential air-fuel ratio as a function of engine speed. The air-fuel ratio of an operating engine is measured while monitoring actual visible exhaust emissions in order to create a table of preferential air-fuel ratios as a function of engine speed so that the table values can be used to control visible exhaust without direct monitoring.

17 Claims, 3 Drawing Sheets

INDIRECT MONITORING AND CONTROL OF VISIBLE EXHAUST EMISSIONS FROM A DIESEL ENGINE

BACKGROUND OF THE INVENTION

This invention relates generally to operation of diesel engines in traction vehicles such as locomotives and relates more particularly to fuel control of diesel engines to reduce exhaust emissions.

Large self-propelled traction vehicles such as locomotives commonly use a diesel engine to drive an electrical transmission comprising generating means for supplying electric power to a plurality of electric traction motors whose rotors are drivingly coupled through speed-reducing gearing to respective axle-wheel sets of the vehicle. The generating means typically comprises a main 3-phase traction alternator whose rotor is mechanically coupled to the output shaft of the engine (typically a 16-cylinder turbo-charged diesel engine). When excitation current is supplied to field windings on the rotating rotor, alternating voltages are generated in the 3-phase stator windings of the alternator. These voltages are rectified and applied to the armature windings of DC traction motors or inverted to controlled frequency AC power and applied to AC traction motors.

During the "motoring" or propulsion mode of operation, a locomotive diesel engine tends to deliver constant power, depending on throttle setting and ambient conditions, regardless of locomotive speed. For maximum performance, the electrical power output of the traction alternator must be suitably controlled so that the locomotive utilizes full engine power. For proper train handling, intermediate power output levels are provided to permit graduation from minimum to full output, but the load on the engine must not exceed whatever level of power the engine can develop. Overloads can cause premature wear, engine stalling or "bogging," or other undesirable effects such as excess exhaust emissions. Historically, locomotive control systems have been designed so that the operator can select the desired level of traction power, in discrete steps between zero and maximum, so that the engine develops whatever level of power the traction and auxiliary loads demand.

Engine horsepower is proportional to the product of the angular velocity at which the crankshaft turns and the torque opposing such motion. For the purpose of varying and regulating the amount of available power, it is common practice to equip a locomotive engine with a speed regulating governor which adjusts the quantity of pressurized diesel fuel (i.e., fuel oil) injected into each of the engine cylinders so that the actual speed (RPM) of the crankshaft corresponds to a desired speed. The desired speed is set, within permissible limits, by a manually operated lever or handle of a throttle that can be selectively moved in eight steps or "notches" between a low power position (N1) and a maximum power position (N8). The throttle handle is part of the control console located in the operator's cab of the locomotive. In addition to the eight conventional power notches, the handle has an "idle" position.

The position of the throttle handle determines the engine speed setting of the associated governor. In a typical electronic fuel injection governor system, the output excitation from a controller drives individual fuel injection pumps for each cylinder allowing the controller to individually control start of and duration of fuel injection for each cylinder. The governor compares the desired speed (as commanded by the throttle) with the actual speed of the engine, and it outputs signals to the controller to set fuel injection timing to minimize any deviation therebetween.

For each of its eight different speed settings, the engine is capable of developing a corresponding constant amount of horsepower (assuming maximum output torque). When the throttle notch 8 is selected, maximum speed (e.g., 1,050 rpm) and maximum rated gross horsepower (e.g., 4,000) are realized. Under normal conditions, the engine power at each notch equals the power demanded by the electric propulsion system which is supplied by the engine-driven main alternator plus power consumed by certain electrically and mechanically driven auxiliary equipments.

The output power (KVA) of the main alternator is proportional to the product of the rms magnitudes of generated voltage and load current. The voltage magnitude varies with the rotational speed of the engine, and it is also a function of the magnitude of excitation current in the alternator field windings. For the purpose of accurately controlling and regulating the amount of power supplied to the electric load circuit, it is common practice to adjust the field strength of the traction alternator to compensate for load changes (traction motor loading and/or auxiliary loading) and minimize the error between actual and desired KVA. The desired power depends on the specific speed setting of the engine. Such excitation control will establish a balanced steady-state condition which results in a substantially constant, optimum electrical power output for each position of the throttle handle.

A traction vehicle, such as a locomotive, also generally includes electrically resistive grid elements selectively connectable to the DC link. During operation of the locomotive, these grid elements are used to dissipate regenerative electrical energy from the locomotive motors so that the locomotive can be operated in a dynamic braking mode in which the motors, acting as generators, electrically retard motion of the locomotive. When the locomotive is at rest, the grid elements can be used for self-loading the locomotive power system for test purposes or to load the diesel engine in order to maintain a desirable operating temperature. En either braking or self-loading, the grid elements are controlled by the vehicle system controller switching a controlled value of resistance onto the DC link.

When the engine is operating, it is desirable to control fuel flow to the engine so that the horsepower developed matches the horsepower required by the electric generator and other equipment coupled to the engine. If the engine is over fueled, incomplete combustion may occur resulting in excessive exhaust emission of unburned hydrocarbons. If insufficient fuel is supplied, the engine will bog and may stall. Thus, it is desirable to provide fuel to the engine at a rate which will enable the engine to meet the power output requirements without having excess fuel that results in excessive exhaust emissions.

One method of monitoring exhaust emissions is to place a probe in the engine exhaust. The probe is connected to a conventional smoke meter which indicates the level of emissions in the exhaust. However, such a method increases vehicle cost and maintenance expense by adding more equipment which will require servicing. Accordingly, it is desirable to provide a method for controlling engine exhaust emission by using other normally monitored engine characteristics.

SUMMARY OF THE INVENTION

The above enumerated desirable features, as well as others, are attained in an illustrative manner in a diesel-electric traction vehicle system by calculating an air-fuel ratio from measured values related to air flow and measured values of fuel flow, comparing the calculated ratio to predetermined idealized ratios and adjusting the diesel engine fuel flow so as to minimize any error between the calculated ratio and the predetermined ratio. Importantly, the applicant has found that variations in air-fuel ratio are precursors of variations in exhaust emissions. Air-fuel ratio errors are anticipatory of exhaust emissions and control of such errors permits minimization of such emissions.

In an exemplary embodiment, a control system operates a diesel-electric locomotive in a test mode while directly monitoring visible exhaust emissions using a smoke meter. Values of air-fuel ratio which produce desirable minimum visible emissions are recorded as a function of engine speed with appropriate loading of the engine using the dynamic brake resistance grid. The air-fuel ratio is calculated from measured values of manifold air pressure and temperature and fuel flow rate. The recorded values of air-fuel ratio are stored in electronic memory in the locomotive control system so that during normal operation of the locomotive, the actual values of air-fuel ratio, calculated in the same manner as in the test mode, can be compared to the recorded values. Any error between the recorded and actual values is then used to adjust engine fueling so as to minimize the error and thereby control visible exhaust emissions.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
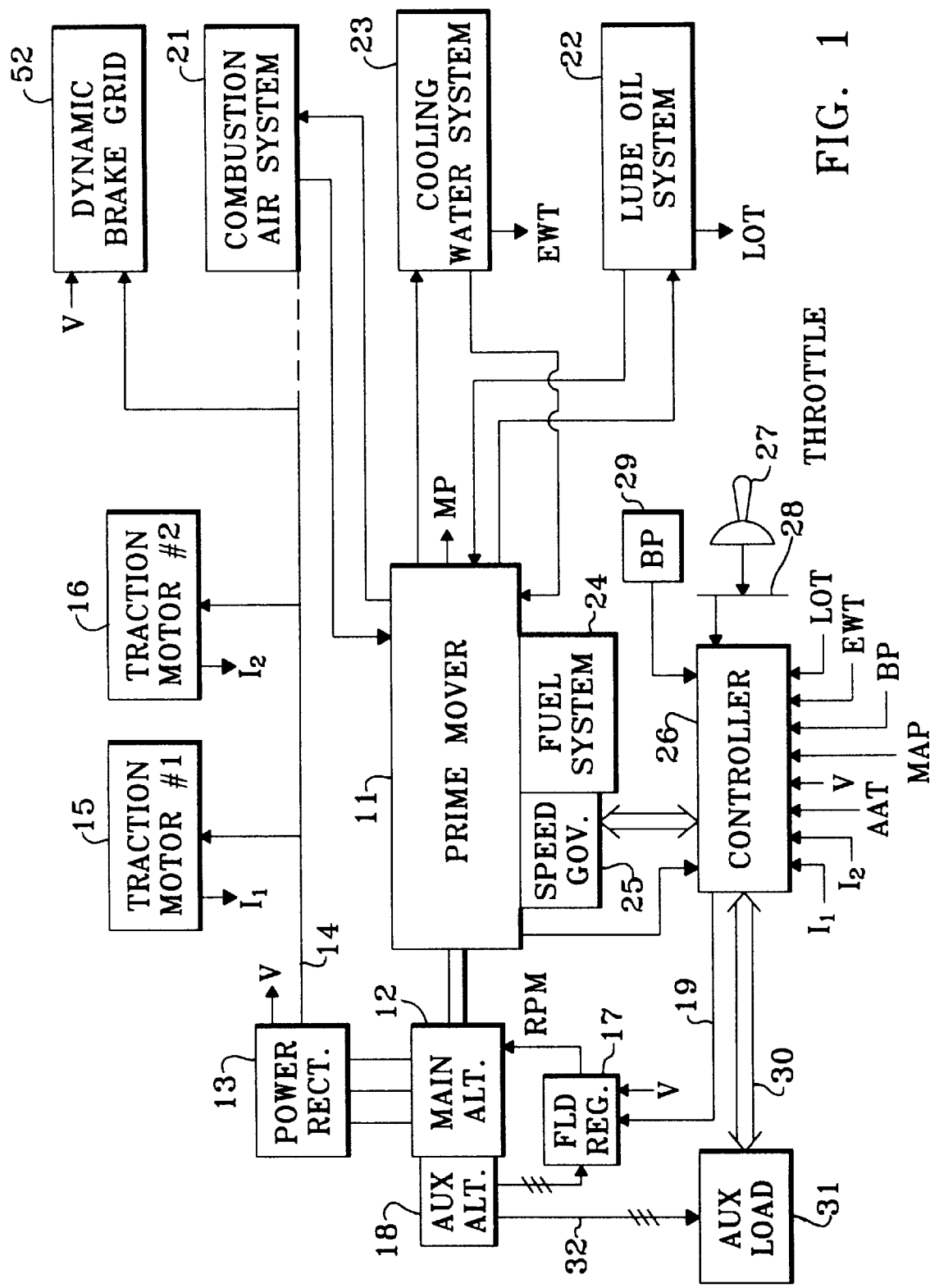
FIG. 1 is a schematic diagram of the principal components of a locomotive system, including a thermal prime mover (such as a diesel engine), a traction alternator, a plurality of traction motors, auxiliary load equipment, and a controller.

Referring now to FIG. 1, there is shown a simplified functional block diagram of a locomotive propulsion system including a variable speed prime mover 11 mechanically coupled to drive a three-phase alternating current (AC) synchronous generator 12, also referred to as a main traction alternator. The three-phase voltages generated by the alternator 12 are applied to AC input terminals of at least one three-phase, bi-directional uncontrolled power rectifier bridge 13. In the illustrated system, the locomotive utilizes DC traction motors 15 and 16 for driving the wheels of the locomotive. In such a case, the rectified electric power output of the bridge 13 is supplied via a DC bus 14 to the parallel connected armature windings of the traction motors 15, 16. While only two motors 15 and 16 are shown, in practice, a traction motor is supplied for each axle of a locomotive and there are typically two to three axles per truck with two trucks per locomotive so that a conventional locomotive may have from four to six traction motors. If the traction motors are AC rather than DC motors, the DC bus 14 is typically connected to a controlled inverter (not shown) which supplies variable frequency power to the AC motors.

The prime mover 11 is a thermal or internal combustion engine and is typically a high horsepower, turbocharged, four stroke, 16 cylinder diesel engine. Such an engine has a number of ancillary systems that are represented by the labeled blocks in FIG. 1. A combustion air system 21 conventionally includes an engine exhaust gas driven turbocharger for compressing air in the combustion air intake manifold of the engine. A lube oil system 22 conventionally includes an engine crankshaft driven pump and associated piping for supplying suitable lubricating oil to the various moving parts of the engine. A cooling water system 23 conventionally includes a pump for circulating relatively cool water from a plurality of air cooled heat exchangers or radiators to a lube oil cooler, to the cylinder liners of the engine for absorbing heat rejected during the combustion process, and also to intercoolers through which the combustion air passes after being compressed by the turbocharger. Still further, the diesel engine includes a fuel system 24 comprising a fuel tank, fuel pumps and nozzles for injecting fuel oil into the respective power cylinders which are arranged in two rows or banks on opposite sides of the engine. Tappet rods cooperate with fuel cams on a pair of camshafts for actuating the respective fuel injectors at the proper times during each full turn of the engine camshaft. The electronic fuel injector controller controls start of and duration of fuel flow into a cylinder each time the associated injector is actuated. The excitation of each fuel pump solenoid, and hence the quantity of fuel that is being supplied to the engine, is controlled by output signals from the engine speed governor system 25. While shown separately, the electronic fuel controller governor 25 is incorporated in the controller 26. The governor regulates engine speed by automatically controlling fuel flow within predetermined limits in a direction and by an amount that minimizes any difference between actual and desired speeds of the engine crankshaft. The desired speed is set by a variable speed control signal received from a controller 26, which signal is herein called a speed command signal or speed call signal.

In a normal motoring or propulsion mode of operation, the value of the engine speed call signal provided by the controller 26 is determined by the position of a handle 27 of a manually operated throttle to which the controller is coupled. A locomotive throttle conventionally has eight power positions or notches (N), plus idle. N1 corresponds to the minimum desired engine speed or power, while N8 corresponds to maximum speed and full power. On a consist of two or more locomotives, only the lead unit is usually attended and the controller on board each trail unit will receive, over a train line 28, an encoded signal that indicates throttle position selected by the operator in the lead unit.

For each power level of the engine there is a corresponding desired load. The controller 26 is arranged to translate the throttle notch information into a control signal of appropriate magnitude on the input line 19 of the alternator field regulator 17, whereby the traction power is regulated to match the called-for power so long as the alternator output voltage and load current are both within predetermined limits. For this purpose, it is necessary to supply the controller 26 with information about various operating conditions and parameters of the propulsion system, including the engine and its support systems. More particularly, the controller 26 typically receives voltage and current feedback signals representative of the power supplied to the traction motors and a load control signal issued by the governor system 25 if the engine cannot develop the power demanded and still maintain the called-for speed. The controller also receives an engine speed signal RPM indicating the rotational speed of the engine crankshaft and ambient air pressure signal BP from a barometric pressure sensor 29, an intake manifold air pressure signal MAP from a pressure sensor associated with an air intake manifold at the engine, and oil temperature signal LOT from a temperature sensor on the hot oil side of the lube oil cooler, and a water temperature signal EWT from a temperature sensor in a hot water section of the cooling water system 23 and an ambient air temperature signal AAT from an appropriate temperature sensor. The controller uses the signal EWT to control radiator fan motors that control the flow of air across the heat exchange tubes of the radiators so as to maintain a relatively constant engine operating temperature over the load range of the engine and with wide variations in ambient temperature.

As discussed above, the controller 26 monitors engine fueling conditions as well as other engine parameters in order to operate the engine for producing the horsepower output needed to enable the locomotive to be propelled at the speed called for by the throttle setting and to supply power for other auxiliary devices. Generally, diesel engine speed is set at either an idle speed (when the locomotive is stationary) or at some predetermined operating speed, e.g., 1100 RPM, when the locomotive is in motion. Fuel to the engine is regulated as a function of the horsepower load on the engine so as to maintain the predetermined engine RPM. For this purpose, the controller 26 utilizes horsepower load requirements to generate a horsepower command signal or horsepower load rate signal which is then used for calculating fuel flow to the engine. The controller 26 can unload the engine if fuel flow demand exceeds allowable limits. Persons skilled in the art of diesel-electric drive systems are familiar with control algorithms and systems which use horsepower load rate to control engine operation by regulating fuel flow in response to throttle settings.

Figure 2:
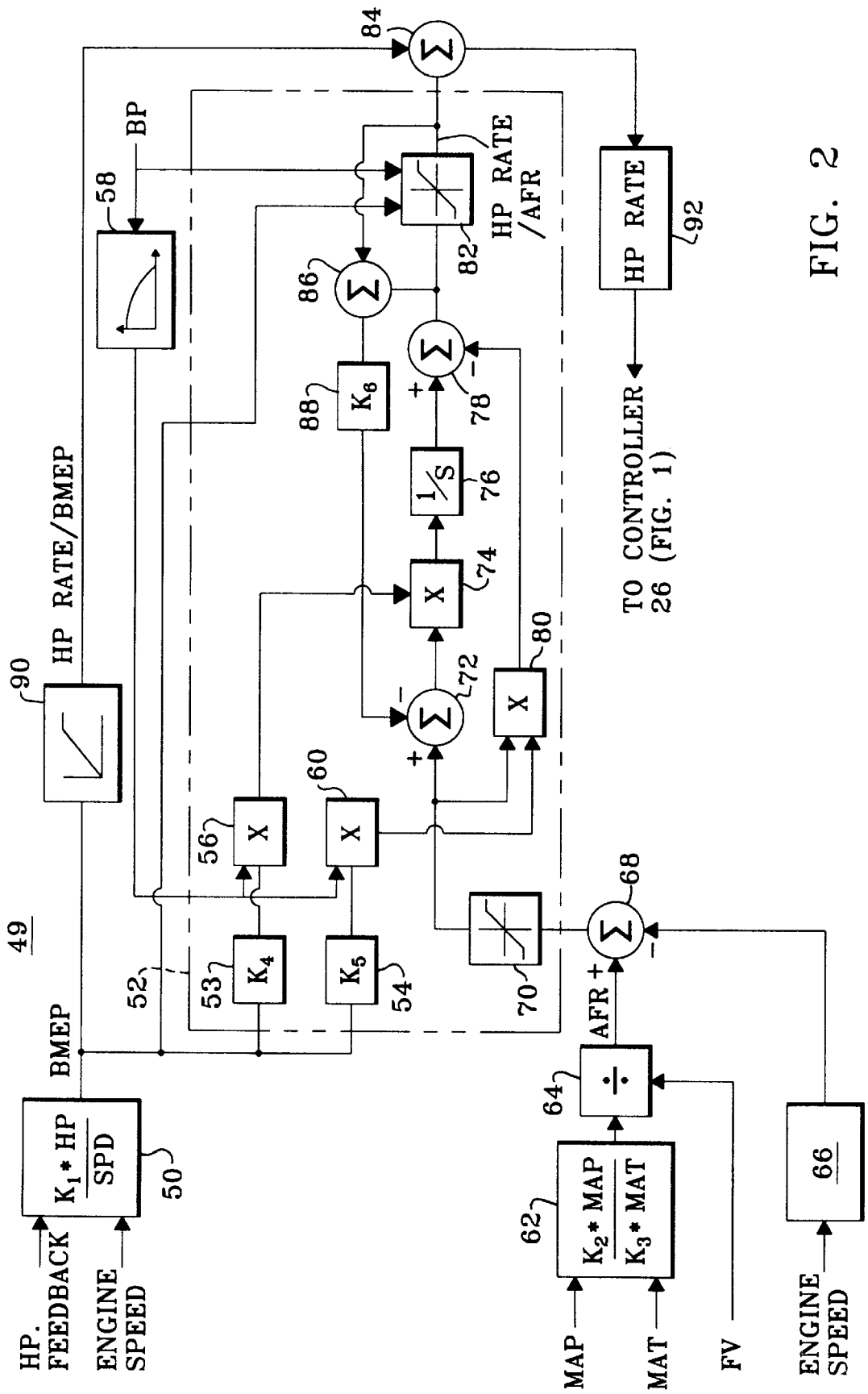
FIG. 2 is a functional block diagram of one implementation of the present invention.

The present invention modifies the horsepower load rate command signal so as to adjust air-fuel ratio in a manner to limit visible exhaust emissions. Referring now to FIG. 2, there is shown a functional block diagram of the engine load rate control 49 in one form of the invention. While the invention could be implemented in hardware circuits equivalent to each of the illustrated block diagrams, the invention is preferably implemented using a computer program operable in the microprocessor based controller 26. The program initially computes brake mean effective pressure (BMEP), block 50, (a value representative of torque) from monitored values of engine speed and computed horsepower (HP-Feedback). Computed horsepower can be determined from measured values of voltage and current at the generator output. The BMEP value is computed by dividing HP-Feedback by engine speed and multiplying the result by a conversion factor $K_1$, which factor is a constant value but varies with the type of engine being controlled and can be determined from measured or computed torque values.

The computed engine BMEP value is converted into a horsepower load rate value and modified by an air/fuel ratio error value to produce an optimum load rate command for minimizing air/fuel ratio error. The BMEP value and an air-fuel ratio error value are applied to a proportional plus integral error controller 52 (or equivalent computer implemented function) whose output becomes the horsepower load rate command. The air-fuel ratio (AFR) calculation begins at block 62 by computing manifold air flow based upon measured values of manifold air pressure (MAP) and manifold air temperature (MAT). Each of the values of MAP and MAT are multiplied by corresponding conversion constants $K_2$, $K_3$ before dividing the adjusted value of MAP by the adjusted value of MAT. The result is the actual manifold air flow. The manifold air flow rate is supplied to a divider circuit 64 in which the divisor is the measured value of fuel flow (FV). The divider circuit 64 provides an output equal to the value of air-fuel ratio (AFR) for the operating engine.

As previously discussed, the desired value of AFR as a function of engine speed (for minimizing visible exhaust emission) is obtained by direct measurement of exhaust emission. These values are then stored in a look-up table indicated at block 66. Values of engine speed are applied to block 66 in order to obtain an output value corresponding to the desired air-fuel ratio. This value of desired air-fuel ratio is combined with the measured or actual air-fuel ratio in a summing block 68 to develop an error signal representing the difference between the actual air-fuel ratio and the desired air-fuel ratio. Typically, the error signal developed by block 68 is limited to some maximum plus or minus value in order to prevent saturation of the controller function 52. The limit function is indicated at block 70. The resultant air-fuel ratio error value (AFR error) is then applied to a summing junction 72 at the input of the controller 52.

The proportional gain portion of controller 52 is partially separated from its integral gain portion where the BMEP values are converted to equivalent horsepower rates and combined with the AFR error value.

The BMEP value is coupled to controller 52 via two separate paths, one for the integral function and one for the proportional function, via corresponding gain blocks 53 and 54. Block 53 provides an integral gain function $K_4$ while block 54 provides a proportional gain function $K_5$. The values of gain functions $K_4$ and $K_5$ are selected so as to generate an equivalent horsepower load rate (HP Rate) at the respective functions, one being an integral HP Rate value and the other a proportional HP Rate value. Each of the blocks 53 and 54 are actually look-up tables rather than calculation functions so that the process operates faster. The HP Rate values developed by each of the integral gain block 53 and proportional gain block 54 are modified by a barometric pressure proportional signal as indicated at blocks 56 and 60. The barometric pressure signal is obtained from a conventional barometric pressure sensor in the locomotive system which is applied to another look-up table, block 58, to generate a horsepower altitude factor adjustment signal. As identified by its name, the block 58 provides a correction factor to compensate for altitude due to the difference in air density at different altitudes. The output values developed by the blocks 56 and 60 are then modified in the controller 52 based on the AFR error value to create the optimum horsepower load rate command.

The integral gain portion of the BP modified HP Rate value (adjusted for altitude) is multiplied by the AFR error signal at block 74. The resultant product from block 74 is then applied through an integral function (1/S) block 76 and the results applied to a function block 78. At the summing block 78, the proportional and integral gain functions of the HP Rate values (modified by AFR error) are recombined. More particularly, the HP Rate proportional gain value from BP adjustment block 60 is applied to another multiplier function block 80 where the HP Rate proportional gain value is multiplied by the AFR error value. The resulting product value is then applied to the summing function block 78. The output of the summing block 78 is a combined proportional plus integral value converted to an unrestricted horsepower load rate command. More particularly, the output of the summing block 78 is the HP Rate value, adjusted for altitude and modified by AFR error and now represents an optimum horsepower load rate command value which can be used to modify the engine horsepower so as to adjust the fueling value so as to minimize AFR error and visible exhaust emissions. The unrestricted HP Rate command is applied to a limit function 82 and from there to a summing block 84. It will be noted that the limit function 82 receives both the barometric pressure signal and the engine BMEP signal and uses those values to set the horsepower rate limit values, i.e., the limit values are adjusted as a function of engine BMEP and altitude. Further, the proportional plus integral function block 52 includes feedback which acts as an anti-windup gain function to prevent saturation in the event the AFR error value becomes relatively large. The difference between the input value and the output value of the limit function block 82 is developed in a summing function block 86 and the resultant difference is applied through a gain function block 88 to the input summing function block 72 where the amplified difference is subtracted from the value of the air-fuel ratio error signal. This assures that the integral value of the proportional plus integral gain function 52 will not force the controller into saturation and prevent rapid correction of the AFR error signal.

Since there is a potential for sensor failure in a locomotive environment, particularly failure of the manifold air temperature and pressure sensors providing the MAT and MAP signals, the BMEP value is used as a look-up value for a look-up table, block 90, which stores minimum HP load rate values. The selected minimum HP load rate value is summed with the computed horsepower load rate adjustment value, block 84, and the summed total becomes the HP load rate command function, block 92. The HP load rate command function sets the horsepower application rate which indirectly sets the engine fuel flow rate.

By adjusting the value from the block 92 as a function of the AFR error, the controller 26 is effective to minimize the AFR error signal and therefore to force the actual air-fuel ratio to closely approximate the desired air fuel ratio.

Figure 3:
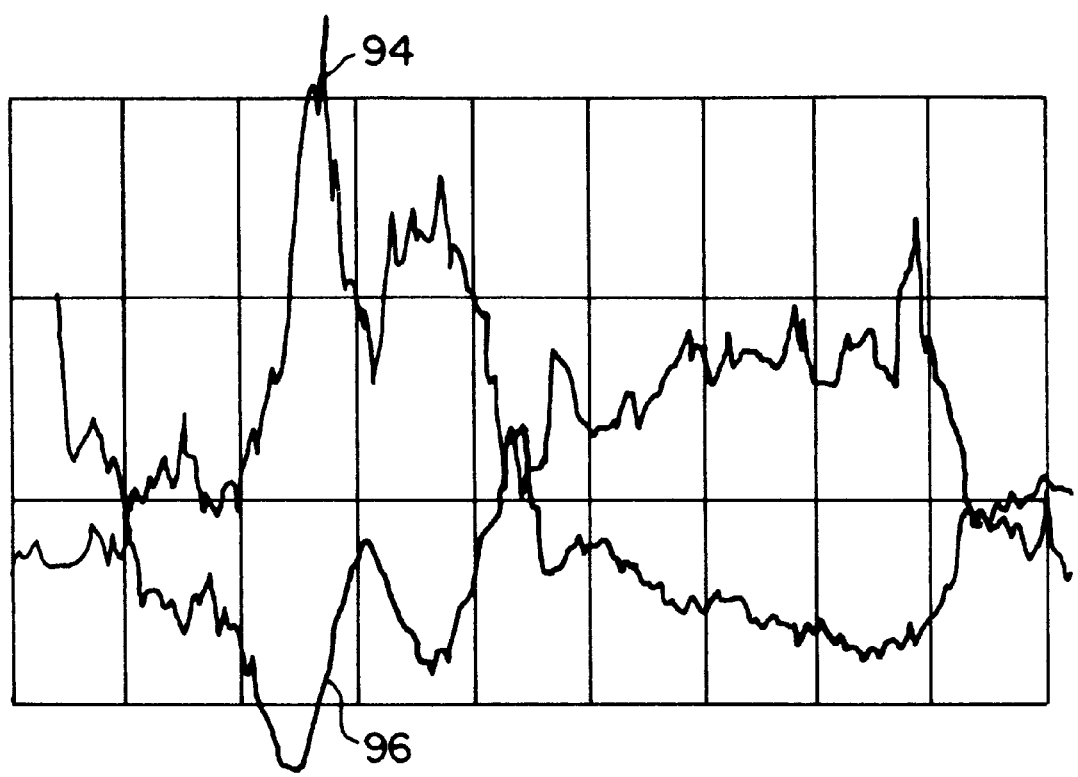
FIG. 3 is a graph illustrating the relationship between exhaust emission and air-fuel ratio in an exemplary engine.

Turning now to FIG. 3, there is shown a graph 94 illustrating visible exhaust emissions and a graph 96 of air-fuel ratio over a selected time interval. These graphs illustrate that air-fuel ratio values are proportional to visible exhaust emissions and that changes in air-fuel ratio occur prior to the time that changes occur in visible exhaust emissions. Accordingly, by monitoring and controlling the air-fuel ratio, one can anticipate changes in visible exhaust emissions and make corrections in air-fuel ratio before the exhaust emissions reach a visible or undesirable state.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed:

1. A method for limiting visible exhaust emissions from an operating diesel engine, the engine being coupled to an engine fuel control responsive to an engine load rate command for controlling fuel supplied to the engine, the method comprising the steps of:

establishing a table of desired values of air-fuel ratio (AFR) as a function of engine speed;

monitoring engine speed and periodically obtaining from the table a desired value of air-fuel ratio at the monitored speed;

computing an actual value of air-fuel ratio from monitored engine operating conditions;

comparing the desired value of air-fuel ratio to the computed value and determining any difference therebetween; and adjusting the engine horsepower application rate so as to minimize the difference obtained in said comparing step.

2. The method of claim 1 wherein the step of computing includes the steps of:

obtaining values of manifold air pressure (MAP) and temperature (MAT) and engine fueling rate (FV);

computing, from the values of MAP and MAT, an engine air flow rate; and dividing the computed air flow rate by the fueling rate to obtain the engine air-fuel ratio.

3. The method of claim 2 and including the steps of:

computing, from monitored values of engine speed and horsepower, a value of brake mean effective pressure (BMEP);

converting the BMEP value to an equivalent horsepower rate (HP Rate) value;

modifying the HP Rate value based on the AFR error value to obtain a HP Rate/AFR value; and applying the HP Rate/AFR value to modify the engine load rate command in a manner to minimize the AFR error.

4. The method of claim 3 and including the further steps of:

sensing ambient barometric pressure (BP); and modifying the HP Rate value in proportion to barometric pressure.

5. The method of claim 4 wherein the step of modifying includes the steps of:

converting the sensed value of BP to an engine horsepower altitude correction factor; and multiplying the HP Rate value by the correction factor.

6. The method of claim 3 wherein the step of combining includes the steps of:

adjusting the BMEP value by an integral gain factor to obtain a integral HP Rate factor;

multiplying the integral HP Rate factor by the AFR error to obtain an AFR adjusted integral HP Rate factor result;

integrating the HP Rate factor to obtain an integral value of the AFR adjusted HP Rate factor;

adjusting the BMEP value by a proportional gain factor to obtain a proportional HP Rate factor;

multiplying the HP Rate factor by the AFR error to obtain a proportional value of the AFR adjusted HP Rate factor; and summing the integral adjusted HP Rate factor and the proportional adjusted HP Rate factor to develop an optimum horsepower load rate command.

7. The method of claim 6 and including the step of converting the BMEP value to a fail safe minimum value of HP Rate and summing the optimum horsepower load rate command with the HP Rate minimum value to generate an engine load rate command for minimizing AFR error.

8. The method of claim 2 wherein the step of adjusting engine horsepower application rate includes the step of self-loading the engine.

9. The method of claim 8 and including a synchronous generator coupled to be driven by the diesel engine and at least one resistance element selectably connectable to receive electric power from the generator, the step of self-loading including the step of connecting the resistance element for dissipating a controlled amount of electric power from the generator.

10. The method of claim 6 and including the step of limiting the optimum horsepower load rate command to a maximum value adjustably set as a function of the BMEP value and barometric pressure.

11. The method of claim 10 and including the method of modifying the value of the AFR error in response to the magnitude of the optimum horsepower load rate command in a manner to optimize response time of the optimum horsepower load rate command to changes in the AFR error value.

12. A method for limiting visible exhaust emissions from a diesel-electric traction vehicle system including a multi-cylinder diesel engine connected for driving a synchronous generator to produce AC electric power, a rectifier connected for converting the AC electric power to DC electric power on a DC link, at least one inverter coupled to the DC link for providing controlled frequency AC power to at least one electric traction motor coupled in driving relationship to at least one wheel of the vehicle, wherein the method comprises regulating of the air-fuel ratio at the engine to minimize any difference between actual air-fuel ratio and a predetermined preferential air-fuel ratio as a function of engine speed.

13. The method of claim 12 wherein the step of regulating includes selectively changing the DC link power to vary loading of the engine for regulating the air-fuel ratio.

14. The method of claim 12 wherein the vehicle system includes an engine control means responsive to a speed command for establishing engine horsepower setting based on loading of the engine through the synchronous generator, the horsepower setting being operative to set a corresponding fuel flow to the engine, the step of regulating including the step of modifying the horsepower setting to thereby adjust the fuel-to-air ratio.

15. The method of claim 14 wherein the step of regulating includes the steps of:

obtaining values of manifold air pressure (MAP) and temperature (MAT) and engine fueling rate (FV);

computing, from the values of MAP and MAT, an engine air flow rate; and dividing the computed air flow rate by the fueling rate to obtain the engine air-fuel ratio.

16. The method of claim 15 wherein the preferential air-fuel ratio is established as a function of engine speed and stored as a table of values in the engine control means, the table values being obtained by the method of operating the engine at various selected speeds and load conditions, adjusting fuel-air ratio to minimize visually observable exhaust emissions and recording the corresponding speed and fuel-air ratio.

17. A system for limiting visible exhaust emissions from an operating diesel engine, the engine being coupled to an engine fuel control responsive to an engine load rate command for controlling fuel supplied to the engine, comprising:

a table of desired values of air-fuel ratio (AFR) as a function of engine speed;

means for monitoring engine speed and periodically obtaining from the table a desired value of air-fuel ratio at the monitored speed;

means for computing an actual value of air-fuel ratio from monitored engine operating conditions;

a comparator for comparing the desired value of air-fuel ratio to the computed value and determining any difference therebetween; and means for adjusting the engine horsepower application rate so as to minimize the difference obtained in said comparing step.

* * * * *